US009667755B2

(12) United States Patent
Schulz et al.

(10) Patent No.: US 9,667,755 B2
(45) Date of Patent: May 30, 2017

(54) PROCESS AUTOMATION SYSTEM AND METHOD FOR OPERATION OF A PROCESS AUTOMATION SYSTEM

(71) Applicant: ABB TECHNOLOGY AG, Zürich (CH)

(72) Inventors: Dirk Schulz, Meckenheim (DE); Markus Ruppert, Hemsbach (DE)

(73) Assignee: ABB Schweiz AG, Baden (CH)

( * ) Notice: Subject to any disclaimer, the term of this patent is extended or adjusted under 35 U.S.C. 154(b) by 391 days.

(21) Appl. No.: 14/317,944

(22) Filed: Jun. 27, 2014

(65) Prior Publication Data

US 2014/0359118 A1     Dec. 4, 2014

Related U.S. Application Data

(63) Continuation of application No. PCT/EP2012/005295, filed on Dec. 20, 2012.

(30) Foreign Application Priority Data

Dec. 27, 2011   (EP) .................................... 11010237

(51) Int. Cl.
*H04L 29/06* (2006.01)
*H04L 12/911* (2013.01)
(Continued)

(52) U.S. Cl.
CPC .......... *H04L 69/18* (2013.01); *H04L 43/0894* (2013.01); *H04L 47/76* (2013.01);
(Continued)

(58) Field of Classification Search
CPC ..... H04L 43/0894; H04L 47/76; H04L 47/82; H04L 67/06; H04L 67/12; H04L 67/14;
(Continued)

(56) References Cited

U.S. PATENT DOCUMENTS 5,673,322 A * 9/1997 Pepe ....................... H04L 63/02
                                                       705/52
6,115,384 A * 9/2000 Parzych .................. H04L 29/06
                                                       370/401
(Continued)

OTHER PUBLICATIONS

Sisson, "FDT Technology What Are DTMs?," May 2009, controlglobal.com, http://www.controlglobal.com/articles/2009/fdtdtm0905/.*
(Continued)

*Primary Examiner* — Ruolei Zong
(74) *Attorney, Agent, or Firm* — Barnes & Thornburg LLP (57) ABSTRACT

A process automation system includes at least one wireless-aware component for detection of the occurrence (e.g., start and end) of a wireless volume data transfer from at least one other component which might be a wireless-unaware component. Upon such detection, the at least one wireless-aware component requests for bandwidth on behalf of the wireless-unaware component to decrease the communication time and subsequently releases this bandwidth again. A method is provided for operation of the process automation system, in which an upload/download is generally detected by either explicit initiation of the upload/download in the wireless-aware component, or by automatic detection in the wireless-aware component.

20 Claims, 5 Drawing Sheets

(51) Int. Cl.
*H04L 12/26* (2006.01)
*H04L 29/08* (2006.01)
*H04L 12/917* (2013.01)

(52) U.S. Cl.
CPC .............. *H04L 47/82* (2013.01); *H04L 67/06* (2013.01); *H04L 67/12* (2013.01); *H04L 67/14* (2013.01); *H04L 67/34* (2013.01); *H04L 69/32* (2013.01)

(58) Field of Classification Search
CPC ......... H04L 67/34; H04L 69/18; H04L 69/32; H04L 67/28; H04L 41/0896; H04L 63/0281
USPC ......................................................... 709/224
See application file for complete search history.

(56) References Cited

U.S. PATENT DOCUMENTS

| | | |
|---|---|---|
| 2006/0187833 A1 | 8/2006 | Montulli et al. |
| 2009/0282161 A1 | 11/2009 | Mathur et al. |
| 2011/0191481 A1* | 8/2011 | Swany ................. H04L 47/724 709/227 |

OTHER PUBLICATIONS

International Search Report (PCT/ISA/210) mailed on Feb. 6, 2013, by the European Patent Office as the International Searching Authority for International Application No. PCT/EP2012/005295.
Written Opinion (PCT/ISA/237) mailed on Feb. 6, 2013, by the European Patent Office as the International Searching Authority for International Application No. PCT/EP2012/005295.

* cited by examiner

PROCESS AUTOMATION SYSTEM AND METHOD FOR OPERATION OF A PROCESS AUTOMATION SYSTEM

RELATED APPLICATION

This application claims priority as a continuation application under 35 U.S.C. §120 to PCT/2012005295, which was filed as an International Application on Dec. 20, 2012 designating the U.S., and which claims priority to European Application 11010237.3 filed in Europe on Dec. 27, 2011. The entire contents of these applications are hereby incorporated by reference in their entireties.

FIELD

The present disclosure relates to a process automation system with means for an automatic performance optimization, for example, an automatic optimization of acyclic data access in multi-protocol communication systems, wherein at least two different communication protocols P1 and P2 are used within the system. Furthermore, the present disclosures relates to a method for operation of a process automation system.

According to the system and method of the present disclosure, from a first P1-aware component a detection of the occurrence, e.g., the start and the end, of a volume data transfer from a second P1-unaware component (a component using the Protocol P2) by use of standardized P1-protocol data access requests is performed, for example, to detect the start and the end of a wireless volume data transfer from a wireless-unaware component using standardized HART commands.

BACKGROUND INFORMATION

The majority of smart field devices installed worldwide are HART-enabled, whereas the HART (Highway Addressable Remote Transducer) Protocol is a global standard for sending and receiving digital information across analog wires between smart devices and a control or monitoring system. More specifically, HART is a bi-directional communication protocol that provides data access between intelligent field instruments and host systems.

In networks, wireless communication is widely used and therefore the WirelessHART technology is likewise widely used and provides a robust wireless protocol for the full range of process measurement, control, asset management applications, device parameterization, and device monitoring and diagnosis.

Based on the proven and familiar HART Communication Protocol, WirelessHART enables users to quickly and easily gain the benefits of wireless technology while maintaining compatibility with existing devices, tools, and systems.

In WirelessHART, the traffic during plant operation consists of few but periodic cyclic burst commands to or from each device. With a plurality of such devices sharing the same (wireless) medium, a significant overall amount of bandwidth is statically reserved and/or thus blocked for other applications, while the individual device can only access a fraction of this overall bandwidth. The existing WirelessHART Network Managers optimize the mesh bandwidth toward this communication pattern.

In comparison, when a user or system function executes a commissioning, diagnosis, or monitoring use-case, this may require a large amount of usable bandwidth to a single device, at an unpredictable point in time, and still expect a fast response. This only occurs acyclically, and the existing WirelessHART Network Managers do not optimize for this communication pattern; they only reserve very little bandwidth for it.

In either case, the actual use of bandwidth does not have any noticeable effect on the schedule; for instance, Network Managers do not dynamically adjust bandwidth to acyclic access. Bandwidth can only be requested explicitly by a number of standard HART commands.

In other words, a drawback with current WirelessHART implementations is that the schedules in WirelessHART are not optimized for acyclic data access; neither do the Network Managers dynamically adjust to this communication pattern (at least with sufficient adaption time). Native WirelessHART devices or their device tools can request additional bandwidth from the Network Manager to still speed up occasional acyclic data access since they are aware of these details of the WirelessHART protocol.

In adapter retrofit scenarios or when using generic HART Device DTMs/FDI packages, the device tools have no knowledge of the wireless network. The only wireless-aware components are the gateway/adapter or their respective software tools.

This means that there is no device-specific component that can automatically adjust the bandwidth between the device and gateway to the amount of transmitted data by using the above-mentioned explicit commands. Statically allocating more bandwidth for acyclic data transfer to each device would still be a suboptimal solution because even more bandwidth is then permanently reserved and/or blocked for other use; furthermore, each device would still get access to only a fraction/share of the theoretically available overall bandwidth.

Particularly for full upload/download sequences, the user faces a high latency even though large amounts of bandwidth may be available in the network.

SUMMARY

An exemplary embodiment of the present disclosure provides a method for operation of a process automation system in which at least two protocols P1, P2 are utilized. The process automation system includes at least one P1-aware component and at least one other component using P2. The t least one other component using P2 is unaware of P1. The exemplary method includes detecting, in the at least one P1-aware component, an occurrence of a volume data transfer from the P1-unaware component, and requesting, by the P1-aware component upon detecting the occurrence of the volume data transfer, for bandwidth on behalf of that P1-unaware component to decrease the communication time and subsequently releasing the requested bandwidth. The exemplary method also includes implementing download detection inside of a P1/P2 Linking Device or Proxy. In addition, the exemplary method includes at least one of requesting and releasing bandwidth through a P1 resource management function using corresponding commands standardized within P1. An upload/download is detected by one of: explicit initiation of the up/download in the P1-aware component, and automatic detection in the P1-aware component. Bandwidth is requested and released by at least one of using proprietary mechanisms of a P1 communication master or its integration components including at least one of an FDT Communication Device-Type Manager (DTM), Field Device Integration (FDI) Gateway Device Package, and a FDI Communication Server, implementing a proprietary command in a P1/P2 linking device or field device that causes them to request bandwidth from the P1 communication master or their integration components, and sending a corresponding standardized request command directly to a P1 resource management function.

An exemplary embodiment of the present disclosure provides a process automation system in which at least two protocols P1, P2 are utilized. The exemplary system includes at least one P1-aware component, and at least one other component using P2, the at least one other component using P2 being unaware of P1. The at least one P1-aware component is configured to detect an occurrence of a volume data transfer from the P1-unaware component, and, upon detection of the occurrence of the volume data transfer, request for bandwidth on behalf of that P1-unaware component to decrease the communication time, and subsequently release the requested bandwidth. Download detection is implemented inside of a P1/ P2 Linking Device or Proxy. The bandwidth is at least one of requested and released through a P1 resource management function using corresponding commands standardized within P1. The at least one P1-aware component is one of a P1 communication master, a P1 slave, a P1/P2 linking device/proxy including at least one of a wireless gateway, a wireless adapter and a wireless device, and a device integration component in the system representing one of the P1 communication master, the P1 slave, and the P1/P2 linking device/proxy.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

In view of the above-mentioned deficiencies with known network environments, exemplary embodiments of the present disclosure harmonize the data traffic in order to provide for secure and complete data transfer irrespective of possibly necessary efforts.

An exemplary embodiment of the present disclosure provides a process automation system using at least two different communication protocols P1 . . . Pn. The exemplary system includes at least one P1-aware component, wherein P1 relates to a wireless protocol, for the detection of the occurrence of a P1 related volume data transfer, for example, a wireless volume data transfer, from at least one other component which might be a P1-unaware component, such as a wireless-unaware component. Upon such detection, the at least one P1-aware component (e.g., the wireless-aware component) requests for bandwidth on behalf of the P1-unaware component (e.g., the wireless-unaware component) to decrease the communication time and subsequently releases this bandwidth again.

According to an exemplary embodiment of the process automation system, upon starting a download from a device, a Communication DTM (Device-Type-Manager) for the P1-gateway and/or the wireless gateway compares the first sequence of a specified number of commands with a command list which it has persistently stored for the specific device type which indicates the transfer of a high volume of data. This list can be either provided by the manufacturer, or the Communication Device-Type-Manager has learned it during previous downloads and checks for matching within a specified time interval. The performance increase is enabled by using a detection list which is shorter than the actual full volume data transfer.

Furthermore, the Communication DTM (Device Type Manager) may be prepared to issue, in case of matching of the commands with those in the command list, a HART bandwidth service request.

According to an exemplary embodiment of the present disclosure, the Communication DTM requests, in case of matching of the commands with those in the command list, additional bandwidth using standardized HART service request commands and/or enables proprietary functions like the Fast-Pipe functionality provided by wireless network managers from DUST Networks to acquire additional bandwidth.

Complementing the request, the Communication DTM which compares the commands releases bandwidth using standardized HART commands and/or closes the Fast-Pipe in case of matching of the commands with a defined number of commands at the end of the internal list or if no commands are sent anymore within a specified time interval.

According to an exemplary embodiment, a process automation system likewise having at least one P1-aware (e.g., wireless-aware) component for detection of the occurrence, e.g., start and end of a P1 related, wireless, volume data transfer from at least one other component which might be a P1-unaware (e.g., a wireless-unaware) component, whereas upon such detection the at least one P1-aware (e.g., wireless-aware) component requests for bandwidth on behalf of that P1-unaware (e.g., wireless-unaware),component to decrease the communication time and subsequently releases this bandwidth again is characterized in that the download detection is implemented inside of a P1-HART Adapter, for example, a WirelessHART Adapter, and bandwidth is requested/released using corresponding standardized HART commands.

According to an exemplary embodiment of the process automation system according to the present disclosure, the P1-aware component is either a wireless device, e.g. gateway, wireless adapter, or field device, or at least one processor (e.g., general purpose or application specific) executing software tangibly recorded in a non-transitory computer-readable recording medium (e.g., ROM, hard disk drive, flash memory, optical memory or other types of non-volatile memory) of a component in the device management system for one device, e.g. FDT Device DTM, FDT (Field Device Tool) Communication DTM, FDI (Field Device Integration) Communication Server, or an FDI (Communication) Device Package. In the exemplary embodiments described herein, the components or means of the components may be implemented by one or more computer processors of one or more computer processing devices executing a computer-readable program tangibly recorded on a non-transitory computer-readable recording medium that, when executed, causes the computer processors to carry out the operative functions of the components as described herein. Accordingly, it is to be understood that when the operative functions and/or means of the components are described herein, the one or more processors of such components can execute a computer program to carry out the operative functions and/or the means as described herein.

Furthermore, the present disclosure is related to a method for operation of a process automation system according to one of the aforementioned features and embodiments whereas an upload/download is generally detected by either explicit initiation of the up/download in the wireless-aware component.

In this case, the wireless-aware component first causes a bandwidth request, then executes the up/download and requests the release of bandwidth.

Alternatively, automatic detection is provided in the wireless-aware component, whereas the wireless-aware component causes a bandwidth request during an ongoing up/download and requests the release of bandwidth after it determines that the access is over.

According to an exemplary embodiment of the method for operation of a process automation system according to the present disclosure, the automatic detection of an up/download is performed by at least one of:

using circumstantial indicators, e.g. an FDT or FDI Connect Request or Upload/Download function, heuristically measuring the average data rate and access duration to a communication end-point and using given threshold values, comparing all access sequences with a set of existing trigger command sequences, keeping a history of recent commands and seeing if a given percentage of hits in a reference command set, e.g., without specific sequence, exists, in particular a "hit list", using a hit list where the commands are determined by device families or profiles, e.g. there is a characteristic command set for temperature transmitters, and using a hit list where the commands are entirely device-specific.

According to an exemplary embodiment of the method for operation of a process automation system, the automatic detection of an up/download is performed by comparing all access sequences with a set of existing trigger command sequences either by comprising all commands of a known access sequence or by only comprising a part of the commands which may be derived from an arbitrary sub-sequence or from the sequence start for the earliest possible detection.

According to an exemplary embodiment of the method for operation of a process automation system, the automatic detection of an up/download is performed by any combination of the alternatives given before, respectively, where at least one detection method delivers a positive result.

According to an exemplary embodiment of the method for operation of a process automation system, the trigger command sequences are learned alternatively by observation, keeping an access history (e.g. a command history which is stored in case of an up-/download detection) and/or by pre-defining it during device manufacturing.

According to an exemplary embodiment, the trigger command sequences are learned by obtaining them in the specific system from available field-device descriptions, whereas as a specialty these descriptions are taken from the device catalog where the device description is an EDD (Electronic Device Description) the command sequences of which are analyzed and/or it is instantiated as part of the specific P1-network, for example, the specific wireless network, by inserting or downloading it during runtime from another source which may have obtained the sequence.

According to an exemplary embodiment, device descriptions for the sequences are looked at and/or EDDs in the device catalog for the sequences are analyzed and/or the sequences are downloaded from another source.

According to an exemplary embodiment, the method for operation of a process automation system according to the present disclosure can be applied for further usage and application methods of the trigger sequence, whereas two forms of implementation are provided.

According to the first form, the trigger sequence is weighed or weighted, and the weight is modified upon each confirmed/unconfirmed detection so that the sub-sequence which is matched before the match is decided positive can be of dynamic length; the detection speed (depending directly on the sequence length being compared) and sequence reliability are thus optimized.

Alternatively, according to the second form, the trigger sequence is weighed or weighted, and the weight is modified upon each confirmed/unconfirmed detection but with an actual reduction/increase of the sequence storage in order to save memory.

Furthermore, the method for operation of a process automation system cares for the bandwidth which is requested and released alternatively by using proprietary mechanisms of a gateway (e.g. a DUST fast-pipe) and/or by implementing a proprietary command in the P1-adapters, for example, the wireless adapters, that causes them to request bandwidth from the gateway, e.g. the network manager, in a standardized way, for example a standardized HART "service request" command, and/or finally by sending a corresponding service request command directly to the gateway network manager.

All these particular forms and versions of the method which has been illustrated in detail before enrich the broad field of the present disclosure in order to minimize the waiting time automatically that engineers or maintenance personnel experience when accessing large amounts of device data acyclically and/or to increase the system detection speed automatically if such data are accessed by an automatic system function, for example, the system cannot know about this and does not perform this method in advance, while at the same time being frugal with bandwidth resources.

Since the personnel is tied to the engineering client while up/downloads occur, minimizing waiting time reduces the commissioning time and subjectively improves the usability of the device management Hence, the present disclosure affects an optimization of acyclic data access.

These and further embodiments and improvements of the disclosure are described in more detail below with reference to exemplary embodiments illustrated in the drawings.

Figure 1:
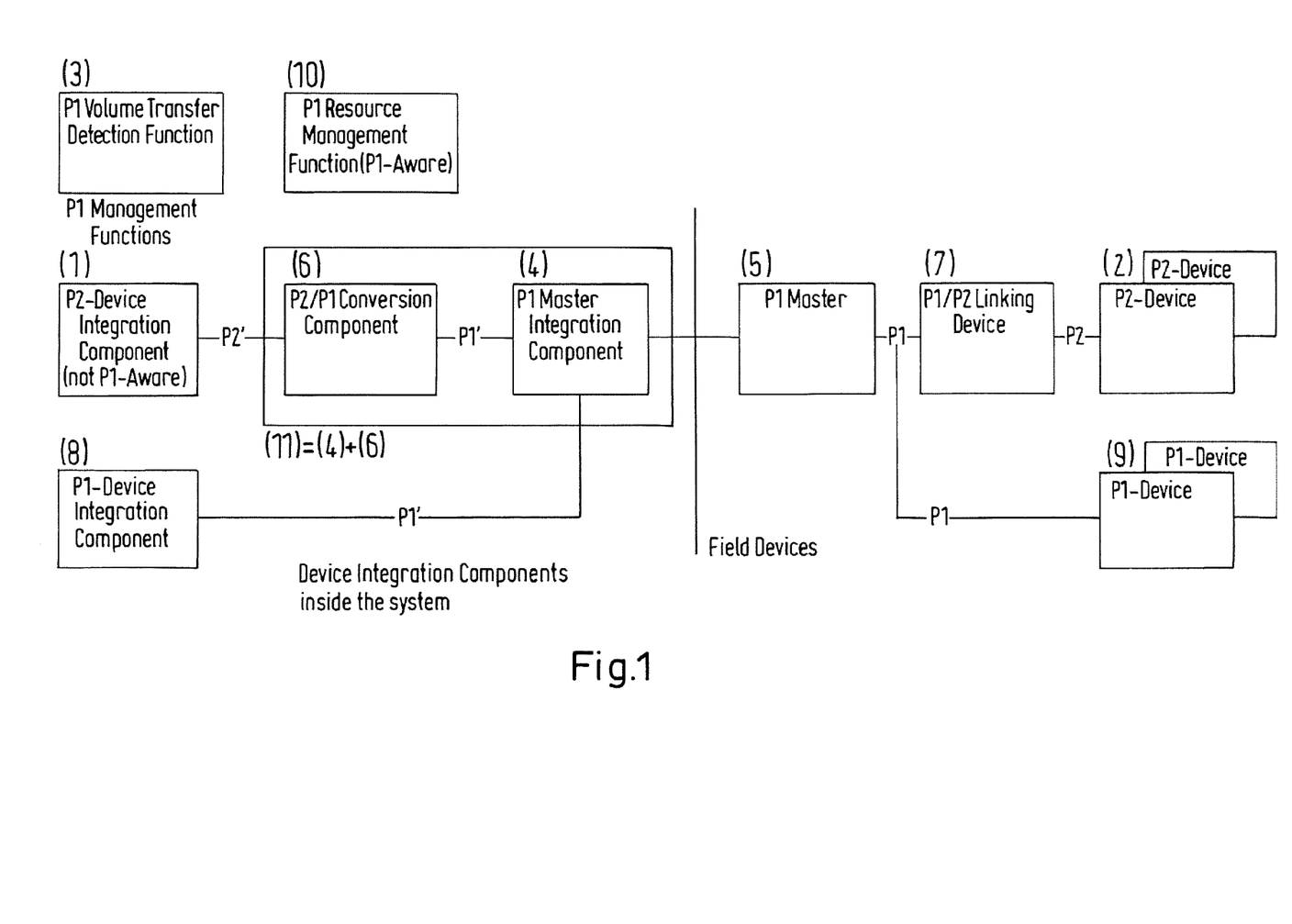
FIG. 1 illustrates an exemplary embodiment of a process automation system according to the present disclosure.

FIG. 1 discloses an exemplary embodiment of a process automation system according to the present disclosure. The process automation system includes at least one wireless-aware component for the detection of the occurrence (e.g., start and end of a wireless volume data transfer) from at least one other component which might be a wireless-unaware component, whereas upon such detection, the at least one wireless-aware component requests for bandwidth on behalf of that wireless-unaware component to decrease the communication time and subsequently releases this bandwidth again.

Furthermore, a corresponding method for operation of the process automation system is disclosed, whereas an upload/download is generally detected by either explicit initiation of the up/download in the wireless-aware component, or by automatic detection in the wireless-aware component.

The exemplary process automation system according to FIG. 1 uses at least two communication protocols P1 and P2, and has at least two devices natively supporting P2 (2). Furthermore, at least one device integration component for these devices (1) is provided, and the system, not only the respective integration component (1), but accordingly the real communication path, wherein the integration components (1), (6), (4) "only" represent this path, is set up so the communication path between P2-device integration component (1) and P2-device (2) uses at least protocols P1 and P2. According to an exemplary embodiment, other protocols may also be involved and used, for example, at arbitrary points between device integration component (1) and device (2)".

The Device Integration Components may communicate ad-hoc or by first establishing an explicit connection to the device and may adapt communication protocols P1 and P2 into variants P1' and P2' to run them inside of the system, for example by means of a data processing management device and/or a computer processor executing a software program tangibly recorded on a non-transitory (non-volatile) memory (e.g., ROM, hard disk drive, flash memory, optical memory, etc.) (e.g., executable program code means), for example, by wrapping them inside another protocol or communication layers like physical or link layer.

The Functions (10), a resource management function, and (3), a volume transfer detection function, may be implemented each within one of the devices and components (2),(4)-(9),(11) and may be implemented individually and communicate with at least one of the components and devices (2),(4)-(9),(11) to fulfil their task Components (4), a P1 master integration component, and (6), a P1/P2 conversion component, may be combined so the resulting single component (11) supports multiple protocols.

Figure 2:
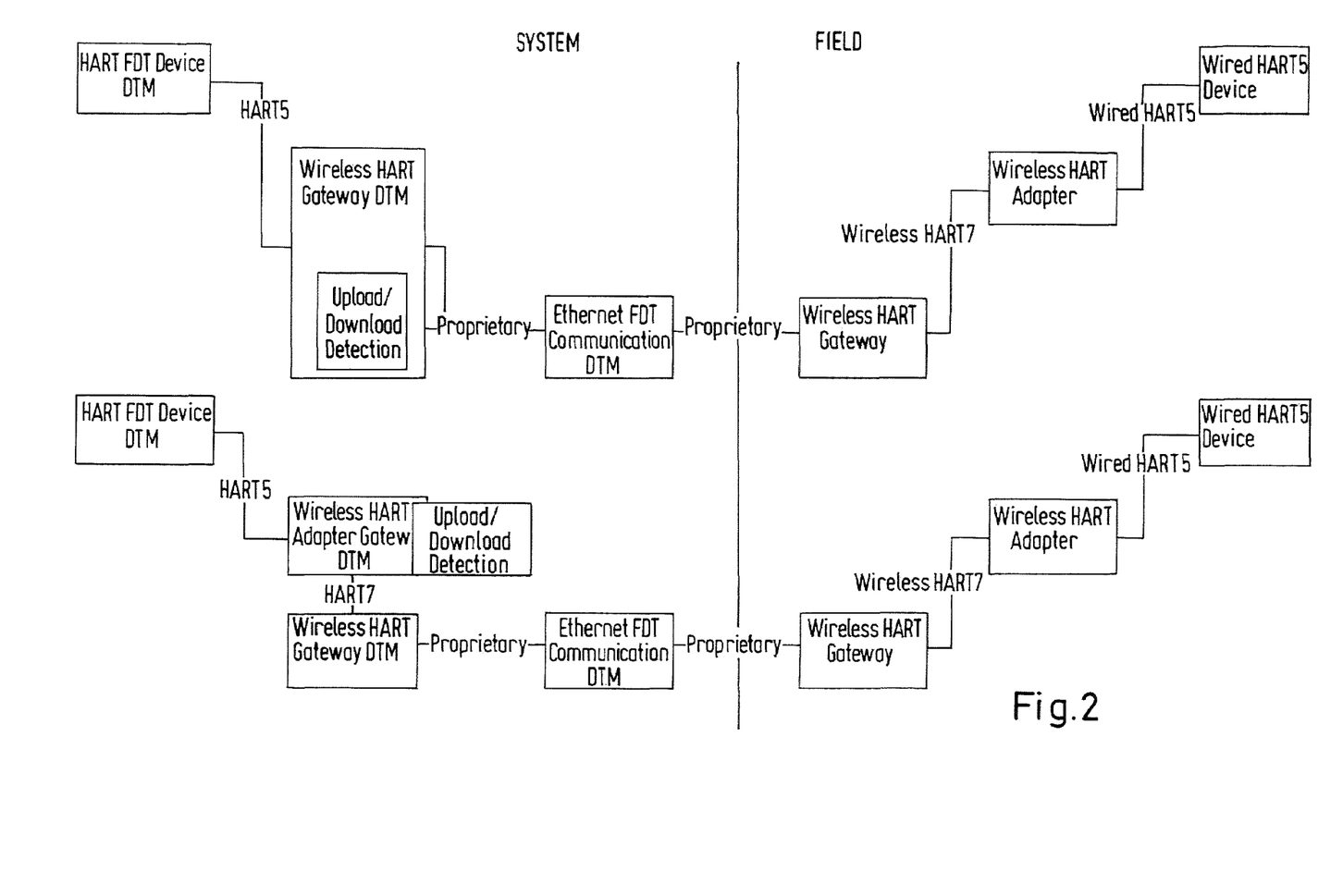
FIG. 2 illustrates an exemplary embodiment of the process automation system by the use of FDT/DTM components on the system side.
Figure 3A:
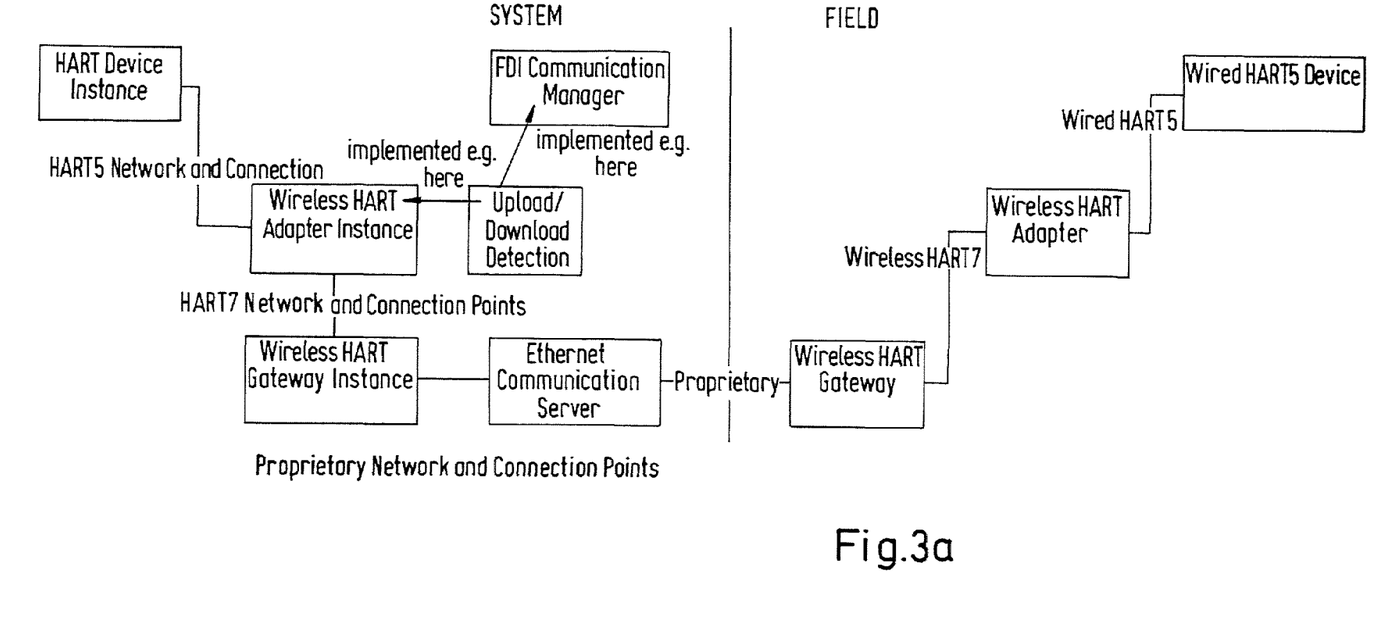
FIG. 3a illustrates an exemplary embodiment of the process automation system by the use of FDI components and an Ethernet Communication Server on the system side.
Figure 3B:
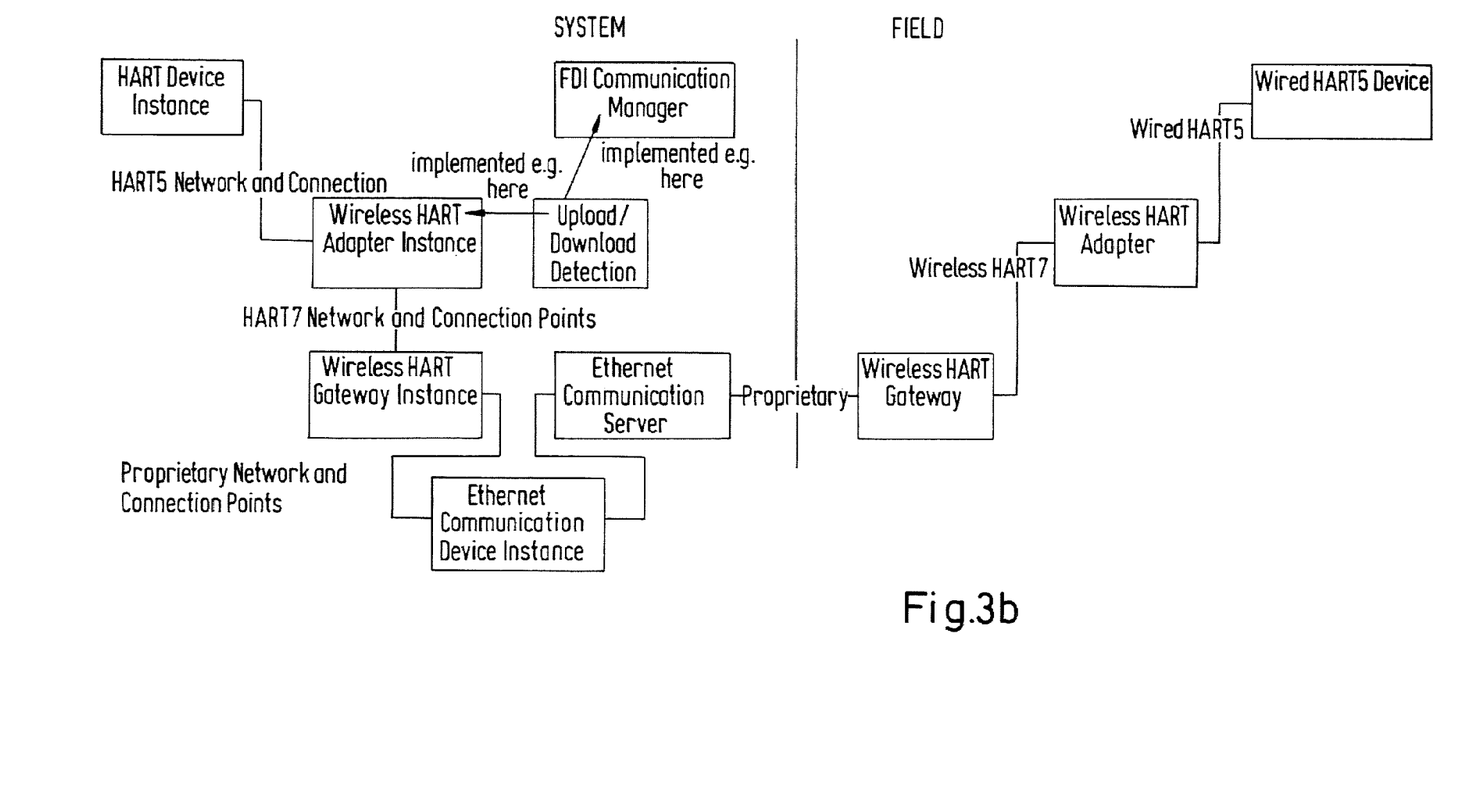
FIG. 3b illustrates an exemplary embodiment of the process automation system by the use of FDI components, an Ethernet communication Device Instance and an Ethernet Communication Server on the system side.
Figure 4:
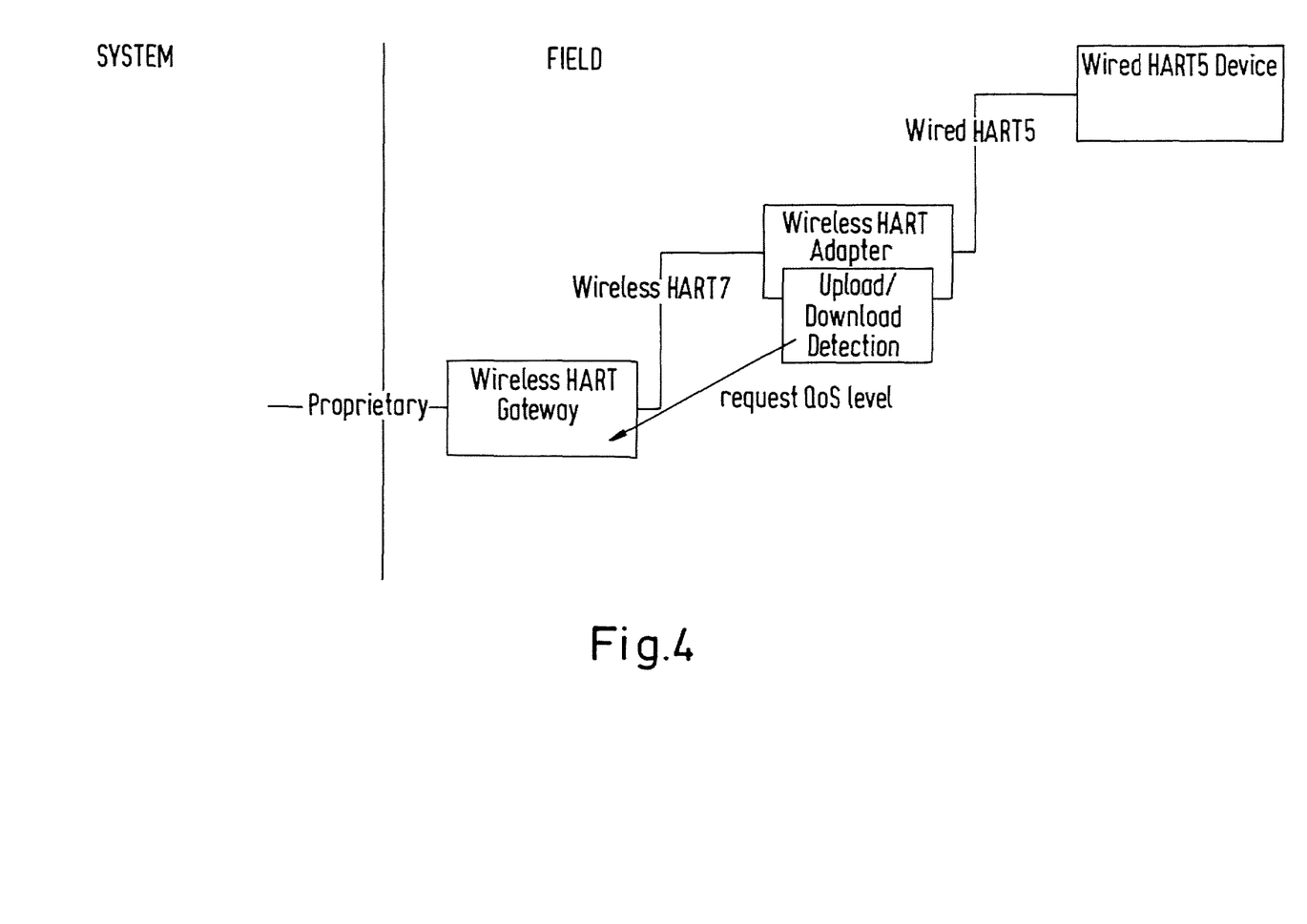
FIG. 4 illustrates an exemplary embodiment of the process automation system including upload/download detection and/or QoS (quality of service) level request from the field side.

Further exemplary embodiments of the system as well as of the method according to the present disclosure are illustrated in FIGS. 2-4.

FIGS. 2-4 illustrate the following features.

A process automation system according to the present disclosure which is characterized in that upon starting a download from a device, the Communication DTM (Device-Type-Manager) for the P1-gateway or the wireless gateway compares the first sequence of a specified number of commands with a command list which it has persistently stored for the specific device type. This list can be either provided by the manufacturer of the Communication Device-Type-Manager and recorded in a non-transitory memory or the Communication Device-Type-Manager has learned it during previous downloads and checks for matching within a specified time interval. The performance increase is enabled by using a detection list which is shorter than the actual full volume data transfer.

Furthermore, the Communication DTM may be prepared to issue, in case of matching of the commands with those in the command list, a HART bandwidth service request.

Moreover, according to an advantageous feature, the Communication DTM requests, in case of matching of the commands with those in the command list, additional bandwidth using standardized HART service request commands and/or enables proprietary functions like the Fast-Pipe from DUST Networks to acquire additional bandwidth.

Complementing the request, the Communication DTM which compares the commands requests the release of bandwidth and/or closes the Fast-Pipe in case of matching of the commands with those at the end of the internal list or if no commands are sent anymore.

According to an exemplary embodiment of a process automation system likewise having at least one P1-aware (e.g., wireless-aware) component for the detection of the occurrence (e.g., start and end of a P1 related, e.g., wireless, volume data transfer) from at least one other component which might be a P1-unaware (e.g., wireless-unaware) component. Upon such detection, the at least one P1-aware (e.g., wireless-aware) component requests for bandwidth on behalf of that P1-unaware (e.g., wireless-unaware) component to decrease the communication time and subsequently releases this bandwidth again. According to an exemplary embodiment, the download detection is implemented inside of a P1-HART Adapter (e.g., a WirelessHART Adapter), and bandwidth is requested/released using corresponding standardized HART commands.

According to an exemplary embodiment of the process automation system according to the present disclosure the P1-aware component may be a wireless device (e.g. gateway, wireless adapter), field device or at least one processor (e.g., general purpose or application specific) executing software tangibly recorded in a non-transitory computer-readable recording medium (e.g., ROM, hard disk drive, flash memory, optical memory or other types of non-volatile memory) of a component in the device management system for one device, e.g. FDT Device DTM, FDT (Field Device Tool) Communication DTM, FDI (Field Device Integration) Communication Server, or an FDI (Communication) Device Package. In the exemplary embodiments described herein, the components or means of the components may be implemented by one or more computer processors of one or more computer processing devices executing a computer-readable program tangibly recorded on a non-transitory computer-readable recording medium that, when executed, causes the computer processors to carry out the operative functions of the components as described herein. Accordingly, it is to be understood that when the operative functions and/or means of the components are described herein, the one or more processors of such components can execute a computer program to carry out the operative functions and/or the means as described herein.

Furthermore, the drawings also illustrate a method for operation of a process automation system according to the present disclosure, whereas an upload/download is generally detected by either explicit initiation of the up/download in the wireless-aware component.

The wireless-aware component first may cause a bandwidth request, then execute the up/download and requests the release of bandwidth.

In accordance with an exemplary embodiment, a means (e.g., above-described processor) for automatic detection can be provided in the wireless-aware component, whereas the wireless-aware component causes a bandwidth request during an ongoing up/download and requests the release of bandwidth after it determines that the access is over.

According to an exemplary embodiment of the method for operation of a process automation system according to the present disclosure, the automatic detection of an up/download is performed by at least one of:

using circumstantial indicators, e.g. an FDT or FDI Connect or Disconnect Request, heuristically measuring the average data rate and access duration to a communication end-point and using given threshold values, comparing all access sequences with a set of existing trigger command sequences, keeping a history of recent commands and seeing if a given percentage of hits in a reference command set, e.g. without specific sequence, exists, in particular a "hit list", using a hit list where the commands are determined by device families or profiles, e.g. there is a characteristic command set for temperature transmitters, and using a hit list where the commands are entirely device-specific.

According to an exemplary embodiment of the method for operation of a process automation system, the automatic detection of an up/download is performed by comparing all access sequences with a set of existing trigger command sequences either by comprising all commands of a known access sequence or by only comprising a part of the commands which may be derived from an arbitrary sub-sequence or from the sequence start for the earliest possible detection.

Moreover, the automatic detection of an up/download may be performed by any combination of the alternatives given before, respectively, where at least one detection method delivers a positive result.

The present disclosure also comprises any combination of embodiments as described herein as well as individual features and developments provided that they do not exclude each other.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for operation of a process automation system in which at least two protocols P1, P2 are utilized, the process automation system including at least one P1-aware component and at least one P1-unaware component using P2, the method comprising:

detecting, in the at least one P1-aware component, an occurrence of a volume data transfer from the P1-unaware component;

requesting, by the P1-aware component, upon detecting the occurrence of the volume data transfer, for bandwidth on behalf of that P1-unaware component to decrease the communication time and subsequently releasing the requested bandwidth;

implementing download detection inside of a P1-and-P2 Linking Device or Proxy; and at least one of requesting and releasing bandwidth through a P1 resource management function using corresponding commands standardized within P1, wherein an upload or download is detected by one of:
explicit initiation of the upload or download in the P1-aware component, and
automatic detection in the P1-aware component, and wherein bandwidth is requested and released by at least one of:
using proprietary mechanisms of a P1 communication master or its integration components including at least one of an FDT Communication Device-Type Manager (DTM), Field Device Integration (FDI) Gateway Device Package, and a FDI Communication Server, implementing a proprietary command in a P1-and-P2 linking device or field device that causes them to request bandwidth from the P1 communication master or their integration components, and sending a corresponding standardized request command directly to a P1 resource management function.

2. The method according to claim 1, wherein the P1 communication master includes at least one of gateway and a linking device.

3. The method according to claim 1, wherein the sending of the corresponding standardized request command includes sending service requests to a network manager inside of the P1 communication master.

4. The method according to claim 1, wherein the automatic detection of an upload or download in the P1-aware component comprises at least one of:

using circumstantial indicators including connection requests in connection-oriented communication;

heuristically measuring an average data rate and access duration to a communication end-point and using given threshold values;

comparing all access sequences with a set of existing trigger command sequences; and comparing all commands in the access sequence with a set of characteristic commands and comparing a number or percentage of hits with a specified threshold.

5. The method according to claim 4, wherein the connection requests include an FDT or FDI Connect Request.

6. The method according to claim 4, wherein the set of characteristic commands is unordered.

7. The method according to claim 1, wherein the automatic detection of an upload or download in the P1-aware component comprises:

comparing all access sequences with a set of existing trigger command sequences, wherein the set of existing trigger command sequences comprises one of all commands of a known access sequence, and only a part of the commands.

8. The method according to claim 4, wherein the automatic detection of an upload or download in the P1-aware component comprises:

comparing all access sequences with a set of existing trigger command sequences, wherein the set of existing trigger command sequences comprises one of all commands of a known access sequence, and only a part of the commands.

9. The method according to claim 1, wherein the automatic detection of an upload or download in the P1-aware component delivers a positive result.

10. The method according to claim 4, wherein the automatic detection of an upload or download in the P1-aware component delivers a positive result.

11. The method according to claim 7, wherein the automatic detection of an upload or download in the P1-aware component delivers a positive result.

12. The method according to claim 8, wherein the automatic detection of an upload or download in the P1-aware component delivers a positive result.

13. The method according claim 4, wherein the trigger command sequences are derived by at least one of:

observation and recording an access history in case of an upload or download detection;

redefining the trigger command sequences during device manufacturing;

obtaining the trigger command sequences in the system from available field-device descriptions;

inserting or downloading the trigger command sequences during runtime from another source which may have obtained the sequence; and obtaining the trigger command sequences from standardized communication requests for device families or pro-files, in particular standardized commands for HART temperature or pressure transmitters.

14. The method according to claim 13, wherein the standardized communication requests include standardized commands for HART temperature or pressure transmitters.

15. The method according to claim 4, wherein at least one of:

the trigger sequence is weighed, and the weight is modified upon each confirmed or unconfirmed detection;

the trigger sequence is weighed or weighted, and the weight is modified upon each confirmed or unconfirmed detection but with an actual reduction or increase of compared elements in order to reduce trigger time; and the trigger sequence is weighed, and the weight is modified upon each confirmed or unconfirmed detection but with an actual reduction or increase of the sequence storage in order to save memory.

16. The method according to claim 13, wherein at least one of:

the trigger sequence is weighed, and the weight is modified upon each confirmed or unconfirmed detection;

the trigger sequence is weighed or weighted, and the weight is modified upon each confirmed or unconfirmed detection but with an actual reduction or increase of compared elements in order to reduce trigger time; and the trigger sequence is weighed, and the weight is modified upon each confirmed or unconfirmed detection but with an actual reduction or increase of the sequence storage in order to save memory.

17. The method according to claim 1, wherein the occurrence of a volume data transfer from the P1-unaware component includes a start and an end of the volume data transfer.

18. A process automation system in which at least two protocols P1, P2 are utilized, the system comprising:

at least one P1-aware process automation component; and at least one P1-unaware process automation component using P2, wherein the at least one P1-aware process automation component is configured to:

detect an occurrence of a volume data transfer from the P1-unaware process automation component, and upon detection of the occurrence of the volume data transfer, request for bandwidth on behalf of that P1-unaware process automation component to decrease the communication time, and subsequently release the requested bandwidth, wherein download detection is implemented inside of a P1-and-P2 Linking Device or Proxy, wherein the bandwidth is at least one of requested and released through a P1 resource management function using corresponding commands standardized within P1, and wherein the at least one P1-aware process automation component is one of:

a P1 communication master, a P1 slave, a P1-and-P2 linking device or proxy including at least one of a wireless gateway, a wireless adapter and a wireless device, and a device integration component in the system representing one of the P1 communication master, the P1 slave, and the P1-and-P2 linking device or proxy.

19. The process automation system according to claim 18, wherein the occurrence of a volume data transfer from the P1-unaware process automation component includes a start and an end of the volume data transfer.

20. The process automation system according to claim 18, wherein the device integration component includes at least one of an FDT Communication Device-Type Manager (DTM), Field Device Integration (FDI) Gateway Device Package, a FDI Communication Server, a FDI Communication Device Instance, an FDI Communication Manager, and an FDI Device Package.

* * * * *